US005253251A

United States Patent [19]

Aramaki

[11] Patent Number: 5,253,251

[45] Date of Patent: Oct. 12, 1993

[54] SWITCHING SYSTEM WITH TIME-STAMPED PACKET DISTRIBUTION INPUT STAGE AND PACKET SEQUENCING OUTPUT STAGE

[75] Inventor: Toshiya Aramaki, Tokyo, Japan

[73] Assignee: NEC Corporation, Tokyo, Japan

[21] Appl. No.: 817,893

[22] Filed: Jan. 8, 1992

[30] Foreign Application Priority Data

Jan. 8, 1991 [JP] Japan ........................................ 3-529
Feb. 27, 1991 [JP] Japan .................................. 3-57971
Apr. 5, 1991 [JP] Japan .................................. 3-72822

[51] Int. Cl.[5] ........................................ H04L 12/56
[52] U.S. Cl. ........................................ 370/60; 370/94.1
[58] Field of Search ........................ 370/54, 58.1, 58.2, 370/58.3, 60, 60.1, 94.1; 340/826, 825.79, 825.8

[56] References Cited

U.S. PATENT DOCUMENTS

| | | | |
|---|---|---|---|
| 4,864,558 | 9/1989 | Imagawa et al. | 370/60 |
| 4,891,803 | 1/1990 | Huang et al. | 370/60 |
| 4,899,334 | 2/1990 | Shimizu | 370/60 |
| 5,020,052 | 5/1991 | DePrycker et al. | 370/60 |
| 5,022,025 | 6/1991 | Urushidni et al. | 370/60 |
| 5,127,000 | 6/1992 | Henrion | 370/60 |

FOREIGN PATENT DOCUMENTS

| | | |
|---|---|---|
| 0328854 | 12/1988 | European Pat. Off. . |
| 62-200594 | 2/1989 | Japan . |

OTHER PUBLICATIONS

H. Kuwahara et al., "A Shared Buffer Memory Switch for an ATM Exchange", (CH26565-9/89/0000-0118) IEEE, 1989 pp. 0118-0122.

*Primary Examiner*—Douglas W. Olms
*Assistant Examiner*—Alpus H. Hsu
*Attorney, Agent, or Firm*—Foley & Lardner

[57] ABSTRACT

In a fast packet switching system, packet distributors are associated respectively with input ports for receiving successive packets therefrom and attaching a timeslot number to each of the received packets, and uniformly distributing the packets to output terminals of each distributor. Packet switches are provided corresponding in number to the output terminals of each packet distributor. Each packet switch has input terminals corresponding in number to the packet distributors and output terminals corresponding in number to the output ports. The input terminals of each packet switch are coupled to respective output terminals of the distributors for switching a packet from one of its input terminals to one of its output terminals in accordance with a destination address contained in the packet. Packet sequencers are associated respectively with the output ports. Each packet sequencer has input terminals coupled to respective output terminals of the packet switches for examining the timeslot numbers attached to packets from its input terminals and delivering the packets to the associated output port in accordance with the examined timeslot numbers.

14 Claims, 12 Drawing Sheets

PACKET DISTRIBUTER $11_i$

PACKET SWITCH $12_i$

LEGEND:
A/F = INPUT PORT ADDRESS FILTER
TSN = TIMESLOT NUMBER

PACKET SEQUENCER 13i

PACKET DISTRIBUTOR $11_i$

PACKET SWITCH $12_i$

PACKET SWITCH $12_i$

PACKET DISTRIBUTOR $11_i$

SWITCHING SYSTEM WITH TIME-STAMPED PACKET DISTRIBUTION INPUT STAGE AND PACKET SEQUENCING OUTPUT STAGE

BACKGROUND OF THE INVENTION

The present invention relates generally to packet switching systems, and more specifically to a fast packet switching system for ISDN (Integrated Services Digital Network).

Research effort has currently been focused on fast packet switching systems for transporting and switching all classes of information by segmenting signals into small packets and transporting them using simplified protocols. An architecture of such a fast packet switching system is described in a paper "A shared buffer memory switch for an ATM exchange", H. Kuwahara et al, (CH2655-9/89/0000-0118) 1989, IEEE. According to this technique, incoming packets are bit-sliced by a serial-to-parallel converters into packet segments for coupling to respective connection oriented sub-switching systems, and sequenced again by parallel-to-serial converters into the original packet at the output port. If the incoming packet has an L-bit length, it can be bit sliced to a maximum of L packet segments, allowing the sub-switching systems to operate at a speed 1/L of the speed of serial processing.

The switching speed of the prior art packet switching systems is given by the relation $N \times V/K$, where V is the line transmission speed, N the number of input ports, and K the number of packet segments into which each packet is bit-sliced. For a given switching speed, the line speed and the number of input ports can be increased by increasing the K value whose maximum value is equal to the bit length L. Typical values are $N=32$, $V=4.8$ Gbps, and $L=K=53$ bytes for a switching speed of 362 Mbps. However, this value is still too high for implementing packet switching systems.

SUMMARY OF THE INVENTION

It is therefore an object of the present invention to provide a packet switching system which is allowed to operate at a switching speed which is suitable for practical implementations.

According to the present invention, there is provided a packet switching system having a plurality of input ports and a plurality of output ports. The system comprises a plurality of packet distributors associated respectively with the input ports for receiving successive packets therefrom, each of the packet distributers attaching a timeslot number to each of the received packets, and uniformly distributing the packets to a plurality of output terminals thereof. A plurality of packet switches comprise the center stage of the system. These packet switches correspond in number to the output terminals of each of the packet distributors, and each of the packet switches has a plurality of input teminals corresponding in number to the packet distributors and a plurality of output terminals corresponding in number to the output ports. The input terminals of each packet switch are coupled to respective output terminals of the packet distributors for switching a packet from one of the input terminals thereof to one of the output terminals thereof in accordance with a destination address contained in the packet. A plurality of packet sequencers are associated respectively with the output ports. Each of the packet sequencers has a plurality of input terminals coupled to respective output terminals of the packet switches for examining the timeslot numbers attached to packets from the input terminals thereof and delivering the packets to the associated output port in accordance with the examined timeslot numbers.

For uniform distribution of packets to the center stage, each of the packet switches generates a traffic-related signal indicating the amount of packets outstanding in the packet switch. Each packet distributor receives the traffic-related signal from each packet switch and gives priority to the output terminals of the packet distributor according to the amounts of packets outstanding in the respective packet switches. In this way, packets from the associated input port are distributed with priority to those of the packet switches containing a smaller amount of outstanding packets.

Although self-routing switches are of benefit for certain applications, bit-slicing technique can be used for higher speed switching application. If bit-slicing technique is used for the center switching stage, the switching speed of the system can be decreased to $N \times V/P \times L$, where P is the number of switches of the center stage.

BRIEF DESCRIPTION OF THE DRAWINGS

The present invention will be described in further detail with reference to the accompanying drawings, in which.

DETAILED DESCRIPTION

Figure 1:
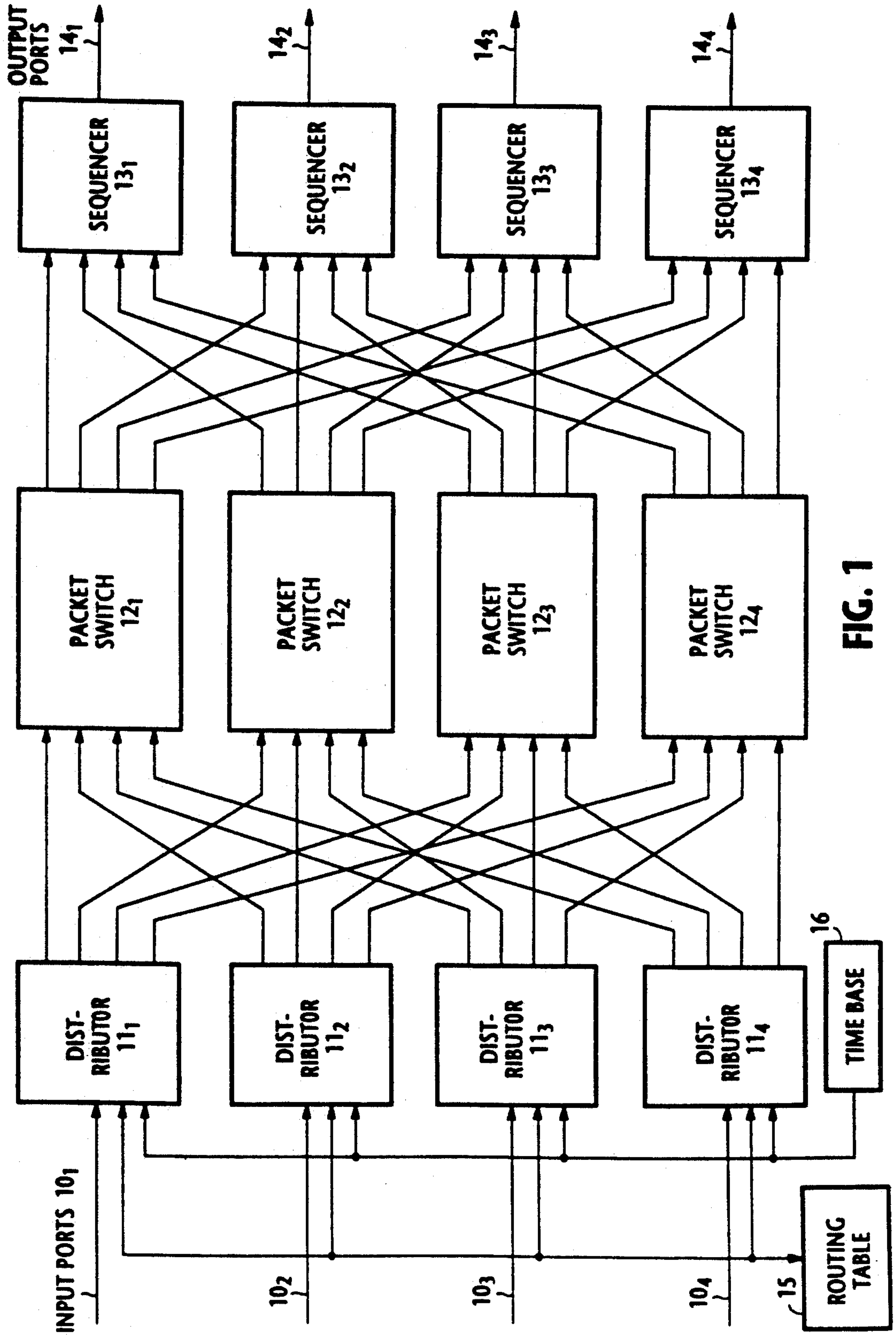
FIG. 1 is a block diagram of a packet switching system of the present invention.

Referring now to FIG. 1, there is shown a packet switching system according to one embodiment of the present invention. For purposes of illustration, the switching system has four input ports $10_1$ through $10_4$ for receiving packets of a predetermined bit length from user stations at a line clock rate specified by the system and switching the received packets to one of four output ports $14_1$ through $14_4$. Each packet contains a label indicating a destination user station. The system comprises a plurality of packet distributors $11_1 \sim 11_4$ corresponding respectively to the input ports $10_1 \sim 10_4$, a plurality of 4×4 self-routing packet switches $12_1 \sim 12_4$ corresponding in number to the packet distributors, and a like plurality of packet sequencers $13_1 \sim 13_4$ corresponding respectively to the output ports $14_1 \sim 14_4$. Each packet distributor $11_i$ has four output terminals coupled respectively to the ith input terminals of all packet switches 12. The output terminals of each packet switch $12_i$ are coupled respectively to the ith input terminals of all packet sequencers 13.

On receiving a packet, each packet distributor $11_i$ extracts the label from the packet and uses it to reference a routing table 15 to attach an outgoing address identifying one of the output ports 14. The distributor proceeds to attach a timeslot number to the packet, selects one of the packet switches 12 and applies the packet to the selected packet switch so that packets received successively from a given user are distributed uniformly to the packet switches. To assign a timeslot number, a series of reference timeslot numbers is cyclically generated by a system time base 16 and supplied to all packet distributors 11. In each self-routing packet switch 12, each packet is examined for its destination and routed to one of the packet sequencers 13 according to the outgoing identifier contained in the label. Because of the parallel switching of successive packets by packet switches $12_1$-$12_4$, each packet switch is given an interval for switching which is four times longer than would otherwise be allowed if the burden is placed on a single packet switch.

Packets destined to a given output port may arrive at the packet sequencer associated with that port at different times. To secure packet sequence integrity, each packet sequencer extracts the time stamp from each packet and uses it to rearrange successive packets in the original sequence.

Figure 2:
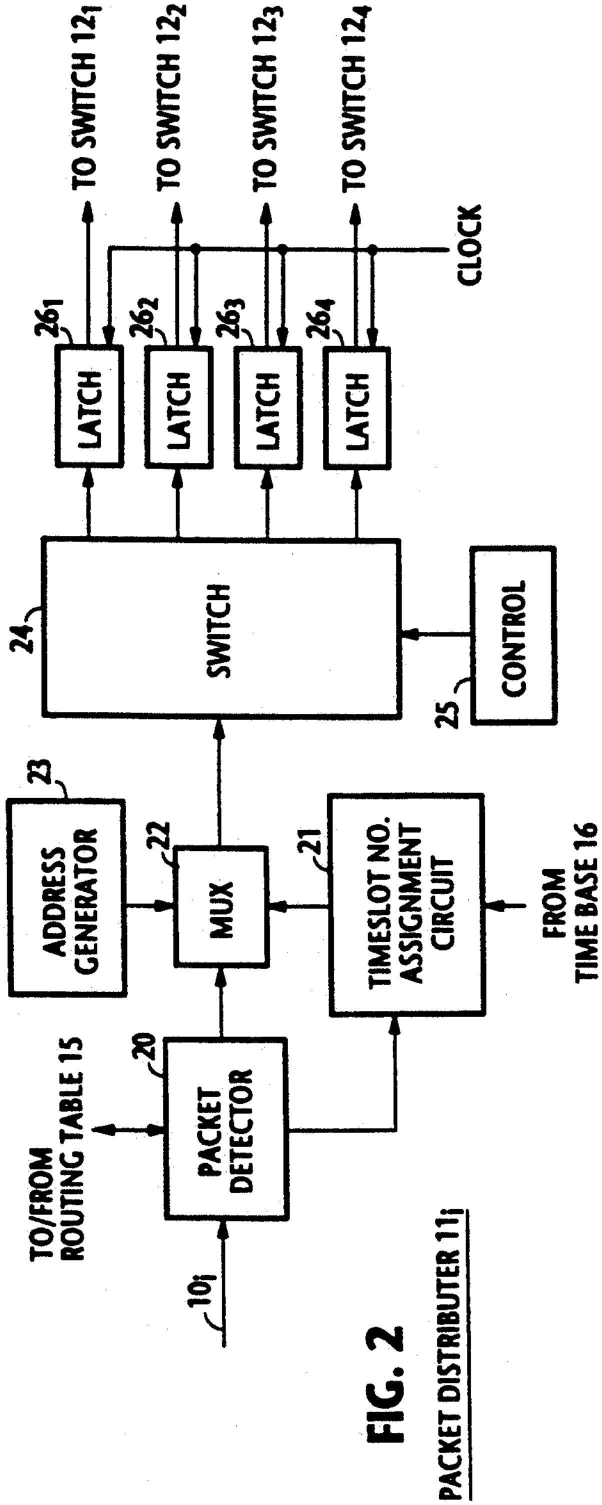
FIG. 2 is a block diagram showing details of each packet distributor of FIG. 1.

Details of the system components will now be described. In FIG. 2, each packet distributor $11_i$ of FIG. 1 comprises a packet detector 20 coupled to the associated input port $10_i$ for extracting a label from each incoming packet and applies it to the routing table 15 to rewrite its label with an outgoing address obtained from the routing table and applies its output to a multiplexer 22. Simultaneously, it informs the arrival of a packet to a timeslot number (TSN) assignment circuit 21 to which the reference timeslot number is supplied from the time base 16. In a practical embodiment, each of the packet switches may hold a sequence of a maximum of, say, 100 outstanding packets. In order to allow identification of packets arriving at a given packet sequencer, timeslot numbers #1 through #100 are assigned respectively to one hundred packets of each successive sequence and the same numbers are cyclically used. The TSN assignment circuit 21 assigns a timeslot number to each packet in response to an output signal from packet detector 20 and applies the assigned number to multiplexer 22 so that the packet is multiplexed with the assigned timeslot number which is unique to the sequence of 100 packets to which it belongs.

An input-port address generator 23 is also connected to multiplexer 22 to append an identifier identifying the input port $10_i$. This identifier will be used by the packet sequencers constructed according to one embodiment of this invention.

The output of multiplexer 22 is applied to a switch 24 which applies packets from multiplexer 22 to latches 26 in accordance with a switching signal supplied from a controller 25. The outputs of latches $26_1 \sim 26_4$ of packet distributor $11_i$ are respectively connected to the ith input terminals of packet switches $12_1$-$12_4$. Controller 25 sequentially selects latches 26 so that successive packets are sequentially distributed to all latches 26. At periodic clock intervals, the packets stored in latches 26 are simultaneously forwarded to the corresponding packet switches 12.

Figure 3:
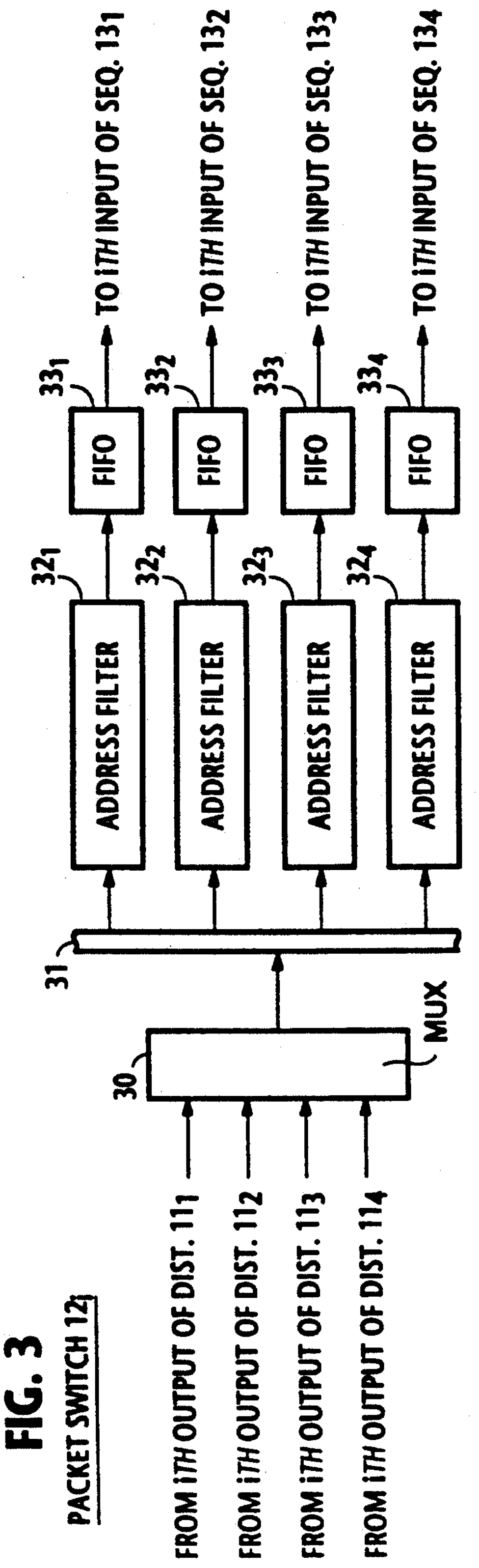
FIG. 3 is a block diagram showing details of each packet switch.

As shown in FIG. 3, each self-routing packet switch $12_i$ comprises a multiplexer 30 for multiplexing signals from the ith outputs of all packet distributors 11 and forwarding the multiplexed signal onto a common bus 31 to which are connected address filters $32_1 \sim 32_4$ having filter addresses identifying respectively the output ports $14_1$-$14_4$. First-in-first-out memories $33_1 \sim 33_4$ are connected respectively to the outputs of address filters $32_1$-$32_4$, the outputs of FIFO memories $33_1 \sim 33_4$ of each packet switch $12_i$ being connected to the ith inputs of packet sequencers $13_1$-$13_4$, respectively. Each address filter 32 examines the outgoing address contained in each of packets arriving from the different packet distributors 11 and detects a match or mismatch with the address of the filter 32. On detecting a match, each address filter $32_i$ allows a packet to be passed therethrough to corresponding FIFO memory $33_i$. The outputs of FIFO memories $33_1$, $33_2$, $33_3$ and $33_4$ of packet switch $12_i$ are connected to the ith input terminals of packet sequencers $13_1$, $13_2$, $13_3$ and $13_4$, respectively.

Figure 4:
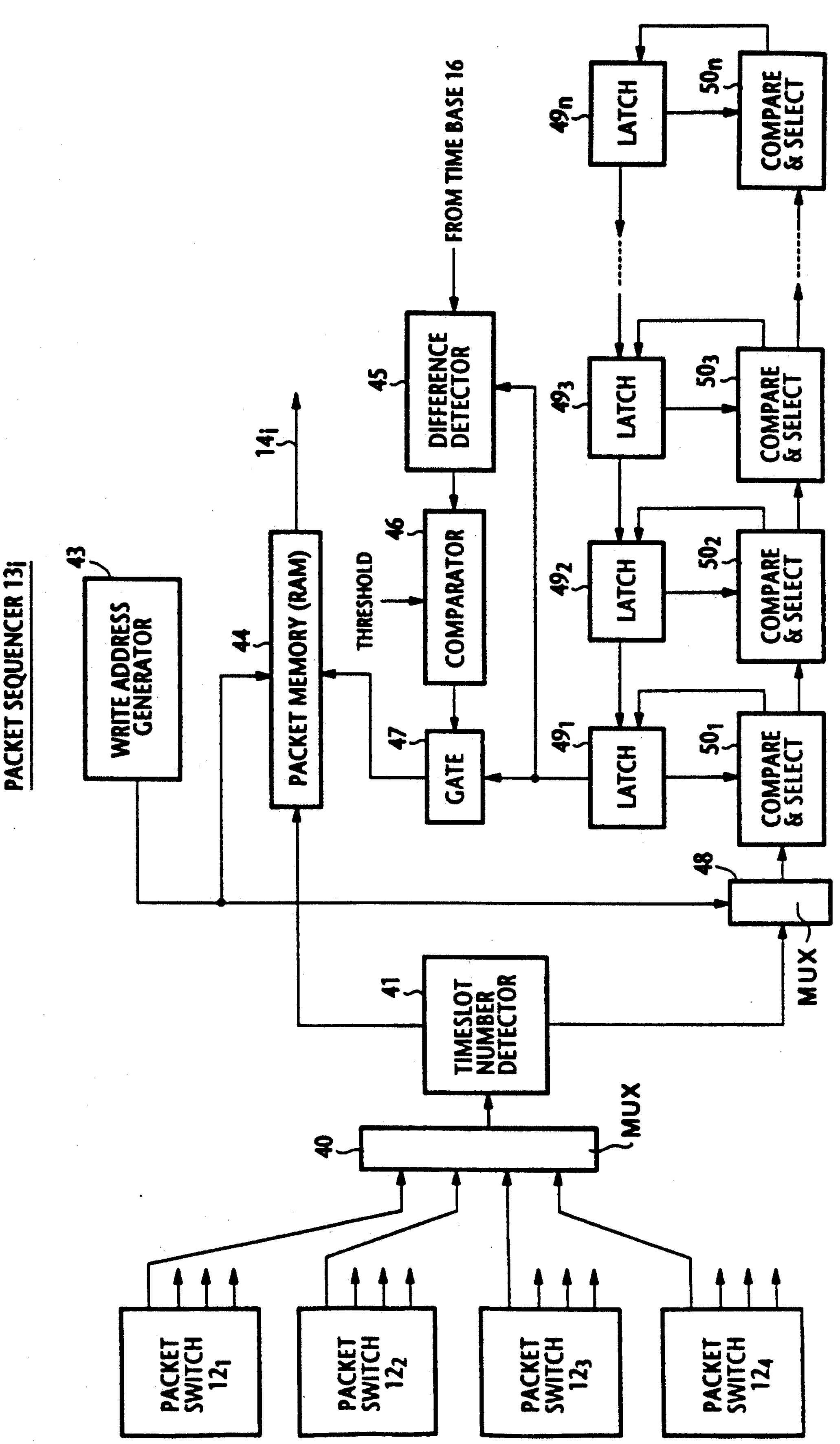
FIG. 4 is a block diagram showing one embodiment of a packet sequencer, FIGS. 4A to 4D showing data sets moving through packet reordering circuit of the sequencer.
Figure 4B:
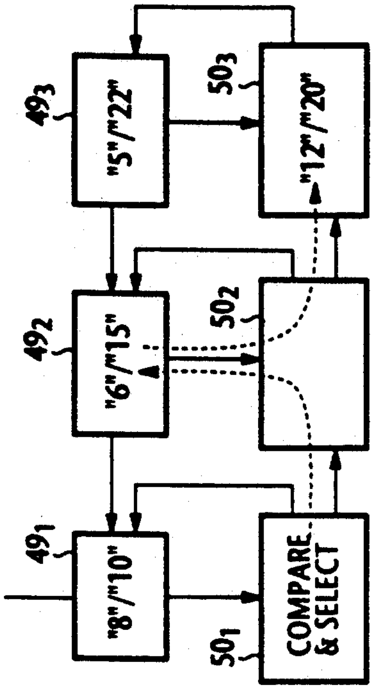

FIG. 4 shows one embodiment of packet sequencer $13_i$. Sequencer $13_i$ comprises a multiplexer 40 for multiplexing signals from the ith output terminals of packet switches $12_1 \sim 12_4$ into a single data bit stream for coupling to a timeslot number detector 41 in which the timeslot number of each packet is removed from the packet and applied to a multiplexer 48, while packets destined to the same output port are supplied to a packet memory (dual-port RAM) in sequence. A write address generator 43 applies sequential write address data to memory 44 so that packets are stored into memory 44 in the order of arrival at the packet sequencer. The write address data is also applied to multiplexer 48 in which it is combined with a timeslot number to form a data set. Latches $49_1 \sim 49_n$ are connected in a series circuit to store and shift a data set from one latch to the next and from one latch to a corresponding one of compare-and-select circuits $50_1 \sim 50_n$ which are also connected in series between the output of multiplexer 48 and latch $49_n$. A difference detector 45 is supplied with the reference timeslot number from time base 16 to detect the difference between it and the timeslot number contained in the output of latch $49_1$. The output of difference detector 45 is applied to a comparator 46 in which it is compared with a threshold value which represents a maximum delay time allowable for each packet and corresponds to the maximum number of packets outstanding in the packet switches. Comparator 46 generates an output signal when the difference output from detector 45 is greater than the threshold value and enables a gate 47 for coupling the address component of a data set from latch $49_1$ to RAM 44 as a read address pointer for reading a packet therefrom corresponding to the timeslot number of that data set. Compare-and-select circuit $50_1$ compares the timeslot number of the output of multiplexer 48 with the timeslot number of a data set stored in latch $49_1$ and transfers the data set from multiplexer 48 to the next compare-and-select circuit $50_2$ if the timeslot number from multiplexer 48 is greater than the timeslot number from latch $49_1$ and interchanges the compared data sets and transfers the data set from latch $49_1$ to the next compare-and-select circuit if the timeslot number from multiplexer 48 is smaller than the other. Likewise, each of the succeeding compare-and-select circuits $50_i$ compares the timeslot number of the output of the preceding compare-and-select circuit with the timeslot number of a data set stored in corresponding latch $49_i$ and transfers the data set from the preceding compare-and-select circuit to the next compare-and-select circuit if the timeslot number from the preceding circuit is greater than the timeslot number from the corresponding latch and interchanges the compared data sets and transfers the data set from the corresponding latch to the next compare-and-select circuit if the timeslot number from the preceding circuit is smaller than the other.

Figure 4A:
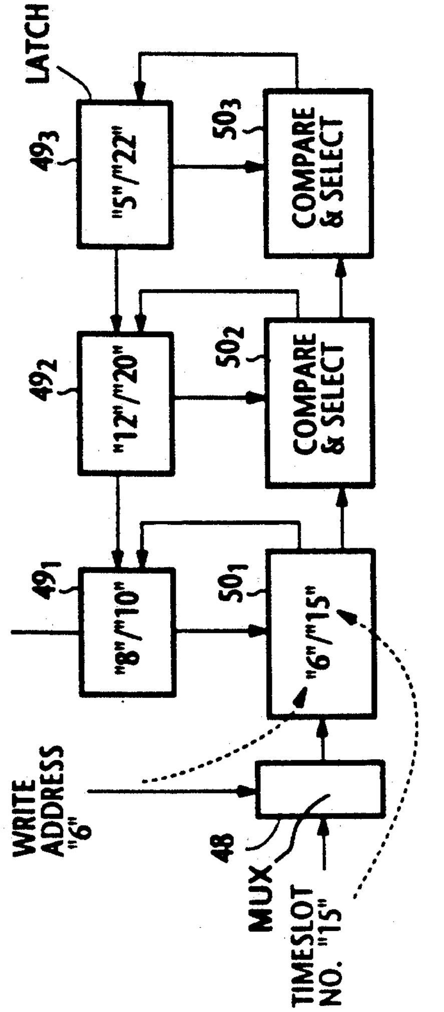
Figure 4D:
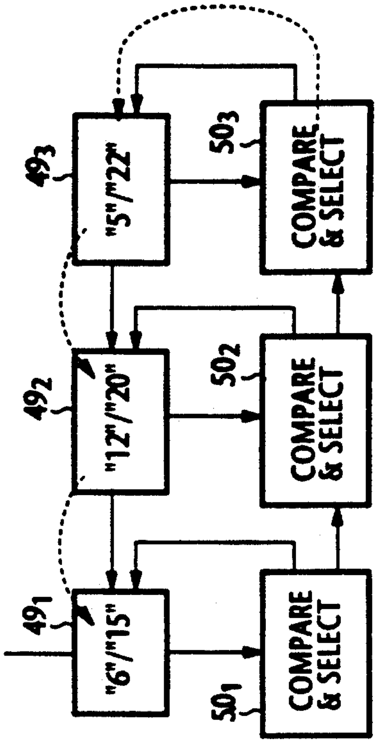
Figure 4C:
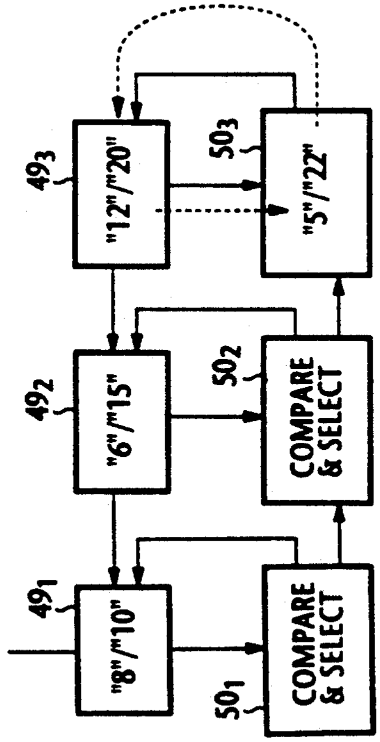

The operation of this packet sequencer will best be understood with reference to FIGS. 4A~4D. For purposes of simplicity, it is assumed that only three sets of compare-and-select circuits and corresponding latches are provided. Assume that a given packet has a timeslot number "15" and is stored in RAM 44 in a location identified by write address data "6". This timeslot number is combined by multiplexer 48 with the timeslot number "15" supplied from write address generator 43 to produce a data set ("6"/"15"). Up to this point, data sets ("8"/"10"), ("12"/"20") and ("5"/"22") are assumed to have been stored respectively in latches $49_1$, $49_2$ and $49_3$, as shown in FIG. 4A. The output of multiplexer 48 is applied to compare-and-select circuit $50_1$ in which the timeslot number "15" is compared with the timeslot number "10" of the data set stored in latch $49_1$. Compare-and-select circuit $50_1$ transfers the data set ("6"/"15") to the next circuit $50_2$ for comparison with the timeslot number "20" stored in corresponding latch $49_2$. Compare-and-select circuit $50_2$ thus interchanges data sets with latch $49_2$ and transfer data set ("12"/"20") to compare-and-select circuit $50_3$ (FIG. 4B) for making a comparison with the timeslot number "22" stored in corresponding latch $49_3$. Thus, data sets in latch $49_3$ and compare-and-select circuit $50_3$ are interchanged and data set ("5"/"22") from latch $49_3$ is transferred to the next compare-and-select circuit (FIG. 4C).

In this way, data sets stored in latches $49_1$~$49_3$ are arranged in the order of timeslot numbers with the timeslot number stored in latch $49_1$ being always the smallest of all timeslot numbers stored in latches 49. At the end of this process, the timeslot number stored in latch $49_1$ is applied to the difference detector 45. If the difference between it and the reference timeslot number is greater than the threshold value, comparator 46 enables gate 47 to pass the address component of the data set stored in latch $49_1$ to RAM 44 as a read address pointer for reading the given packet mentioned above. Simultaneously, data sets stored in all latches 49 are shifted to the left as shown in FIG. 4D.

Since the reference timeslot number represents the real time, the output of difference detector 45 indicates the amount of time a packet has elapsed from the time at which a timeslot number is assigned to it by a packet distributer $11_i$. Thus, each packet is read out of memory 44 following the detection of a maximum delay time within which an outstanding packet having a smaller timeslot number than any of the packets in the sequencer $13_i$ may possible exist in a packet switch 12. Thus, the packet read out of memory 44 is ensured that it is the earliest of all packets in a packet sequencer $13_i$ for a given instant of time.

Figure 5:
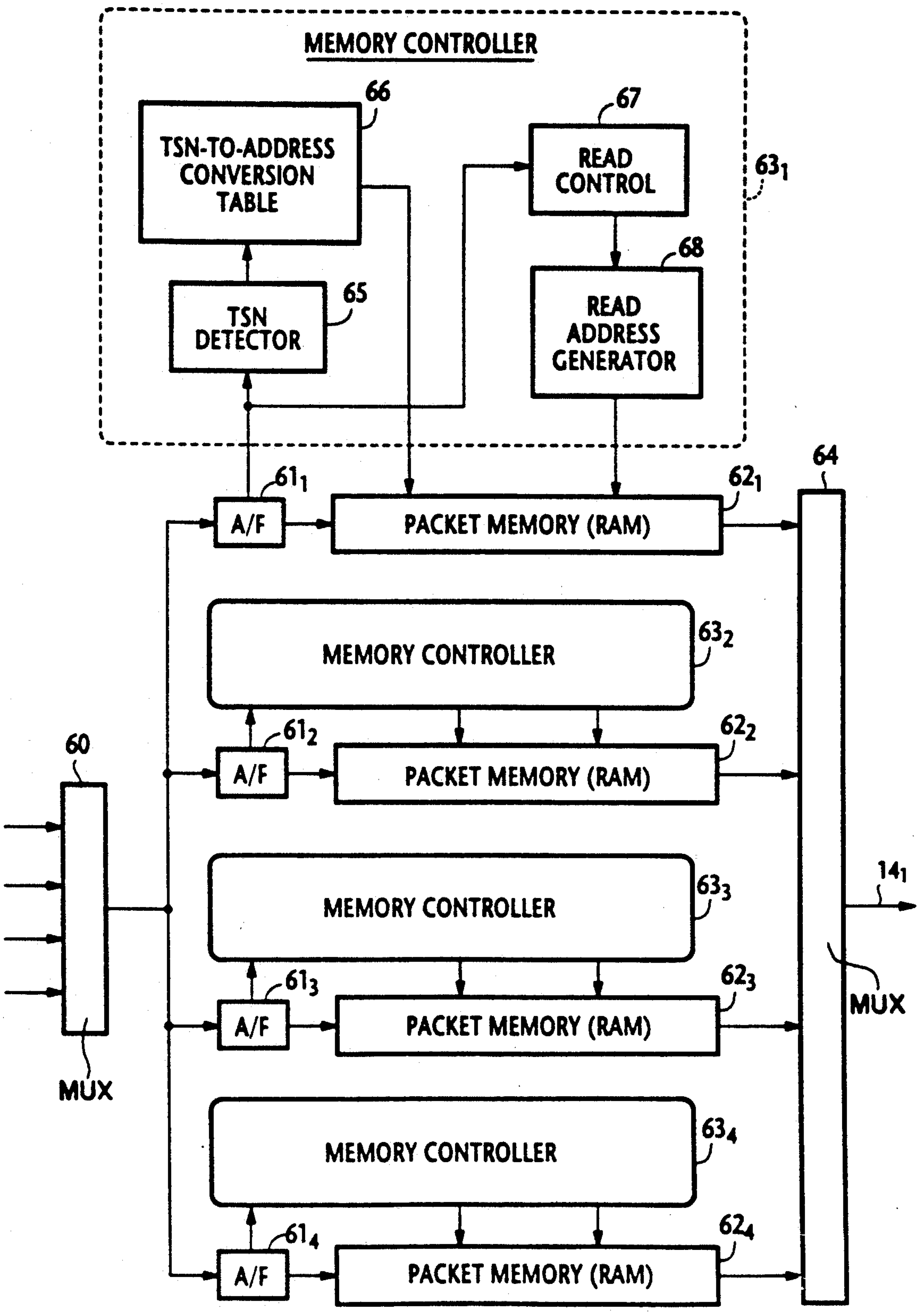
FIG. 5 is a block diagram showing a first modification of the packet sequencer.

The packet sequencers are modified in several forms as shown in FIGS. 5 to 8. In FIG. 5, sequencer $13_i$ includes a multiplexer 60 in which the output signals from the ith output terminals of all packet switches 12 are multiplexed into a series of packets. The output of multiplexer 60 is connected to address filters $61_1$~$61_4$ to which dual-port RAMs $62_1$~$62_4$ are respectively connected. The address of each filter $61_i$ (where i=1, 2, 3, 4) corresponds to the address of the input port $10_i$. Each address filter $61_i$ examines each packet for the input-port address generated by the address generator 23 of a packet distributor $11_i$ (FIG. 2) and detects a match or mismatch with the own filter address. If a match is detected, the address filter passes the matched packet to the associated memory 62. Therefore, packets coming from the same input port $10_i$ are passed through address filter $61_i$ and stored into packet memory $62_i$. Memory controllers $63_i$ are associated respectively with address filters $61_i$ and packet memories $62_i$ to provide read/write control on associated packets for sequential delivery to a multiplexer 64 in which the packets having the same destination but coming from different input ports 11 are sequentially arranged and delivered to output port $14_i$.

Each memory controller $63_i$ comprises a timeslot number detector 65 coupled to the associated address filter $61_i$ to extract a timeslot number from each packet for coupling to a timeslot-to-address conversion table 66. There is a map in the conversion table 66 uniquely specifying relationships between all timeslot numbers and corresponding storage locations of memory $62_i$. It is seen therefore that conversion table 66 can produce a write address corresponding to each timeslot number, and hence all packets stored in RAM $62_i$ can be sequentially readable. The write address data from table 66 is applied to packet memory $62_i$. A read control circuit 67 monitors the output of address filter $61_i$ to supply a read enable pulse to a read address generator 68 when the highest of timeslot numbers is reached to start sequential reading of packets from RAM $62_i$. In this way, packets which might have arrived out of sequence are arranged into the right order.

Figure 6:
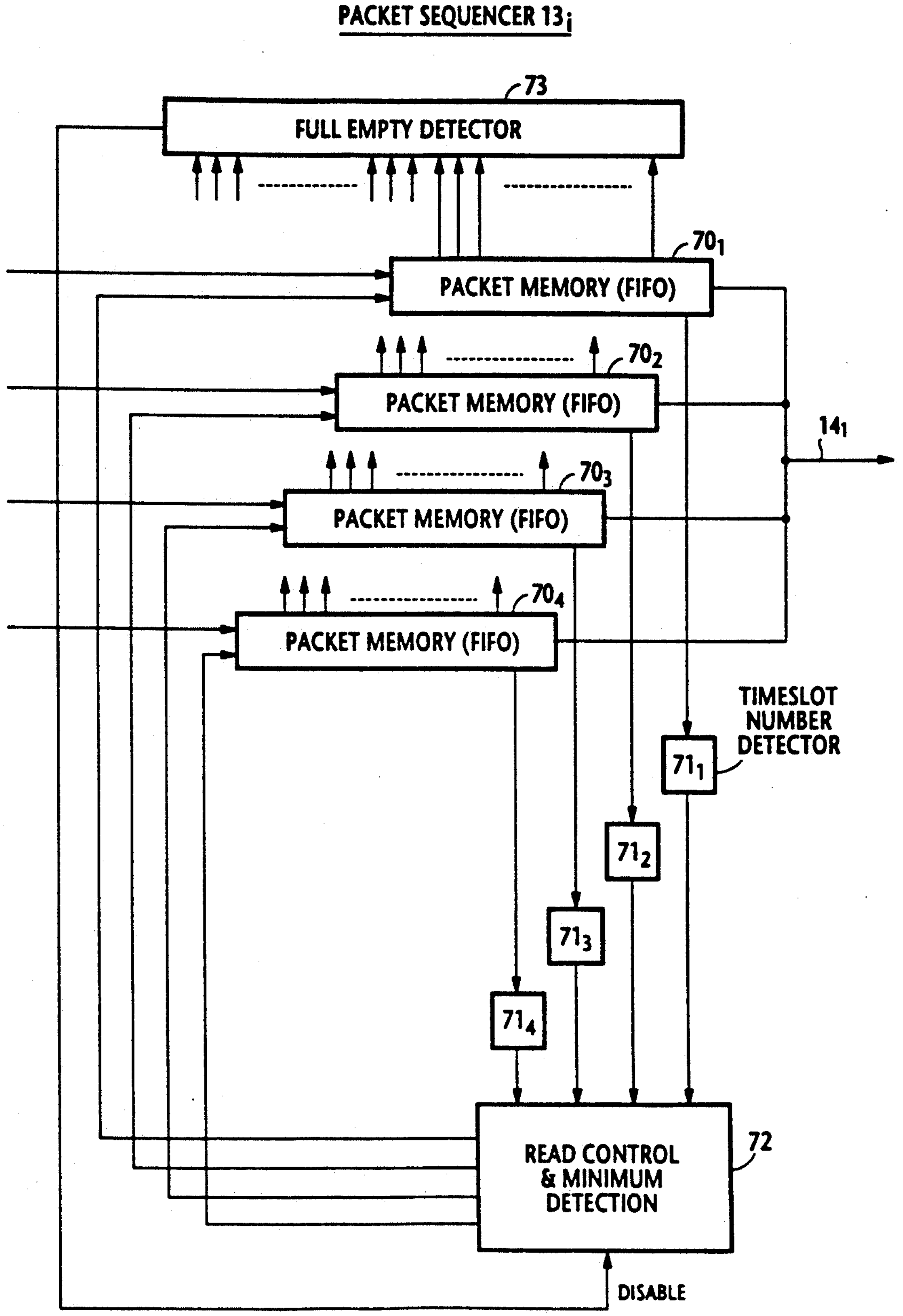
FIG. 6 is a block diagram of a second modification of the packet sequencer.

A simplified form of sequencer $13_i$ is shown in FIG. 6. Sequencer $13_i$ includes first-in-first-out memories $70_1$–$70_4$ for storing packets from the ith output terminals of packet switches $12_1$~$12_4$, respectively. Timeslot number detectors $71_1$–$71_4$ are respectively coupled to the end storage cell of the memories $70_1$–$70_4$ for examining packets of earliest arrival to detect their timeslot numbers. The outputs of timeslot number detectors $71_1$~$71_4$ are applied to a read control and minimum detection circuit 72 for detecting the smallest of the timeslot numbers supplied from timeslot number detectors 71 and applies a shift-out pulse to one of the FIFO memories corresponding to the smallest time slot number. In this way, a packet arriving earliest of those stored in the output ends of FIFO memories $70_1$–$70_4$ is shifted out of a FIFO memory $70_k$ to output port $14_i$. The same process is repeated to deliver a packet of second arrival from the output end of another FIFO memory. A full empty detector 73 is connected to all FIFO memories 70 to disable the read control and minimum detection circuit 72 when at least one of the packet memories 70 is all empty to prevent an out-of-sequence situtation which might occur if there is a packet outstanding in a packet switch 12 which is earlier than any of those in the FIFO memories 70.

Figure 7:
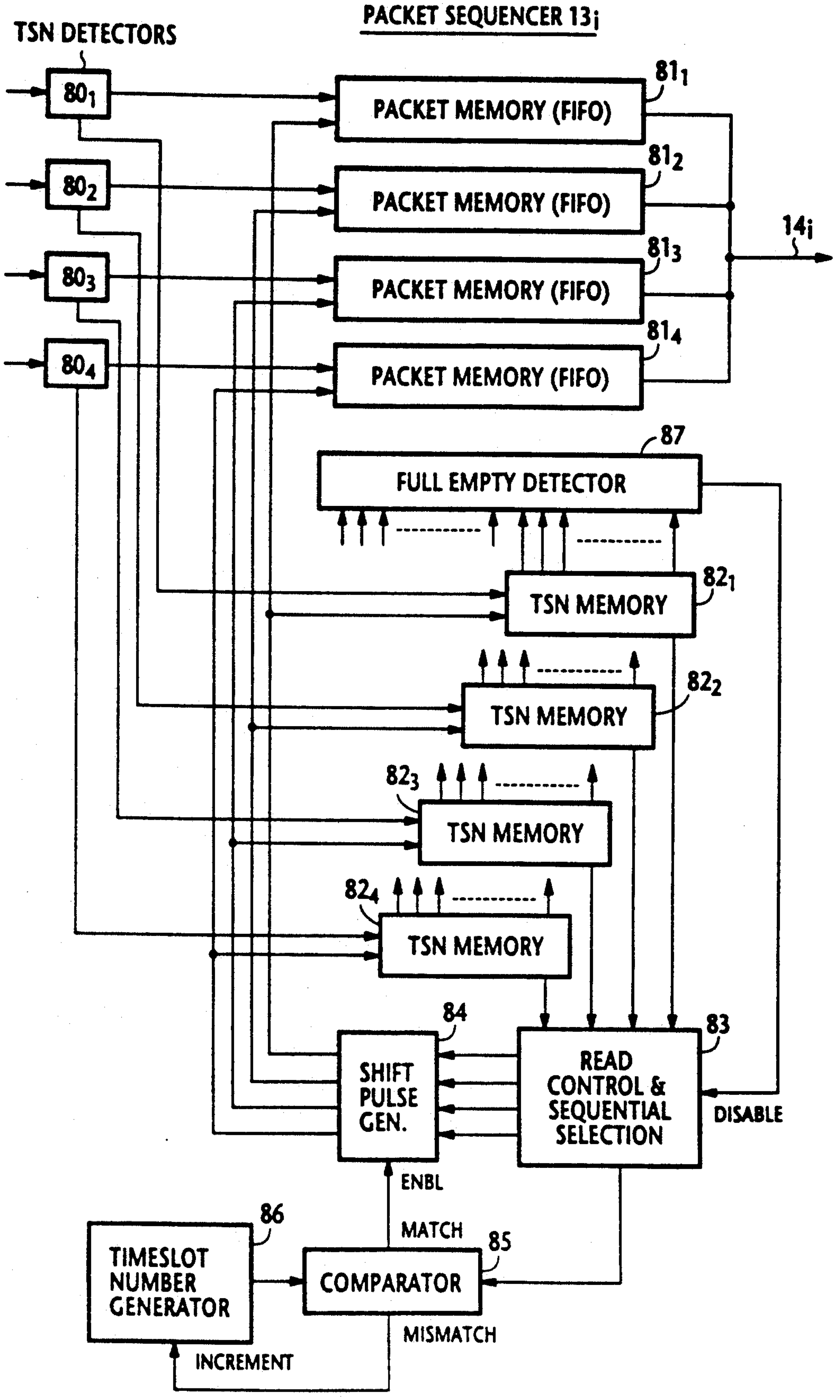
FIG. 7 is a block diagram of a third modification of the packet sequencer.

In FIG. 7, a third modification of the packet sequencer $13_i$ is illustrated as comprising timeslot number (TSN) detectors $80_1$~$80_4$ connected respectively to the ith output terminals of all packet switches 12. TSN detectors 80 extract timeslot numbers from received packets and stores the timeslot numbers into TSN memories (FIFO) $82_1$-$82_4$, respectively. With the timeslot numbers being removed, the packets from TSN detectors $80_1$~$80_4$ are stored into FIFO memories $81_1$-$81_4$, respectively, whose outputs are coupled together to output ports $14_i$. A read control and sequential selection (RCSS) circuit 83 is connected to the output ends of TSN memories 82 to sequentially read the timeslot numbers of earliest arrivals and sequentially apply a select command signal to a shift pulse generator 8. The read timeslot numbers sequentially read out from memories 82 are supplied from RCSS circuit 83 to a comparator 85 for comparison with a timeslot number supplied from a local timeslot number generator 86. When the timeslot numbers are equal, comparator 85 supplies an enable pulse to shift pulse generator 84 to allow it to apply the select command signal from RCSS circuit 83 to a packet memory $81_k$ to shift out the packet from that memory to output port $14_i$. The same shift pulse is applied to the corresponding timeslot memory $82_k$. If they mismatch, comparator 85 causes timeslot number generator 86 to increment its value by one. A full empty detector 87 is provided for disabling the RCSS circuit 83 if at least one of the memories 81 is all empty to prevent the possible out-of-sequence situation as mentioned above.

Figure 8:
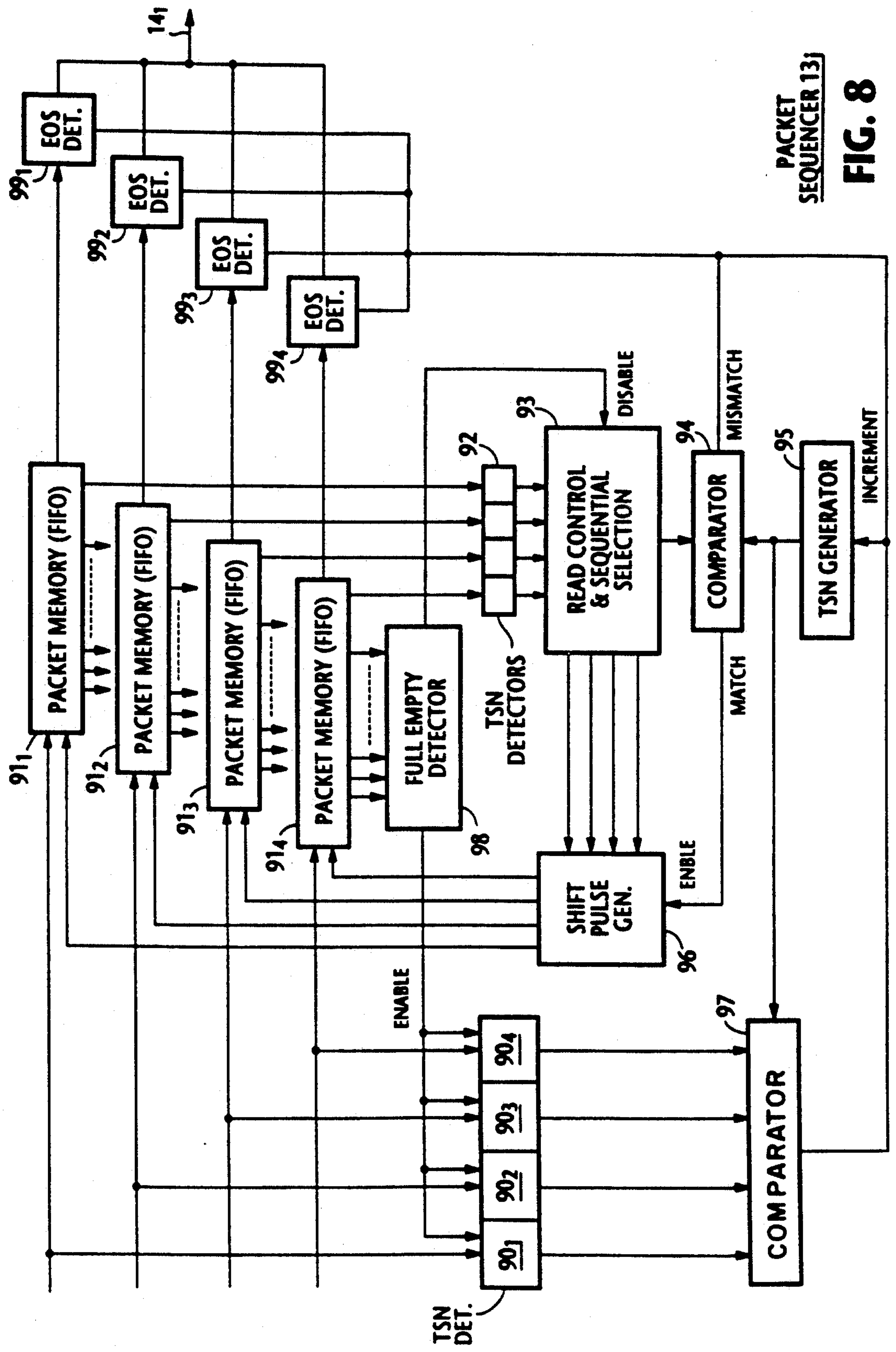
FIG. 8 is a block diagram of a fourth modification of the packet sequencer.

A fourth embodiment of the packet sequencer $13_i$ is shown in FIG. 8. Respective packets from the packet switches 12 are supplied to timeslot number detectors $90_1$-$90_4$ on the one hand and stored into FIFO packet memories $91_1$-$91_4$ on the other hand. To the output ends of FIFO memories 91 are respectively connected timeslot number detectors 92 whose outputs are, in turn, connected to a read control and sequential selection (RCSS) circuit 93 which sequentially read the outputs of timeslot detectors 92 for coupling to a comparator 94 in which it is compared with the output of a local timeslot number generator 95. The RCSS circuit 93 supplies a select command signal which is sequentially applied to a shift pulse generator 96 when enabled in response to the detection of a match by comparator 94 between the two timeslot numbers in a manner similar to the embodiment of FIG. 7, so that one of the packet memories 91 is shifted in response to a shift-out pulse supplied from generator 96. TSN generator 95 is incremented by one in response to the detection of a mismatch between the timeslot numbers by comparator 94.

A full empty detector 98 is connected to all packet memories 91 to enable the TSN detectors 90 when at least one of the packet memories is empty, while disabling the RCSS circuit 93. The output of TSN generator 95 is further applied to a comparator 97 for comparison with the outputs of TSN detectors 90 when enabled by the full empty detector 98. TSN generator 95 is also incremented by one in response to an output signal from comparator 97 which is generated when the locally generated timeslot number is determined by the comparator as being smaller than any of the detected timeslot numbers.

To the outputs of packet memories 91 are respectively connected end-of-sequence detectors $99_1$~$99_4$. Each of these end-of-sequence detectors 99 monitors successive output packets from the associated packet memory to detect the absence of a packet to follow. If the absence of a subsequent packet is detected, each end-of-sequence detector 99 causes the TSN generator 95 to increment its value by one.

If one of the packet memories 91 is empty, a situation arises that a subsequent packet to fill that vacant memory will have a timeslot number greater than the current value of the locally generated timeslot number. If this is the case, the locally generated timeslot number is smaller than any of the detected timeslot numbers, and comparator 97 produces an output signal for incrementing TSN generator 95. On the other hand, when there is no subsequent output packet from one of the packet memories 91, the corresponding end-of-sequence detector 99 supplies an increment command signal to the TSN generator 95. By incrementing the TSN generator in this way, the total amount of time taken to process packets in the sequencers can be decreased.

Figure 9:
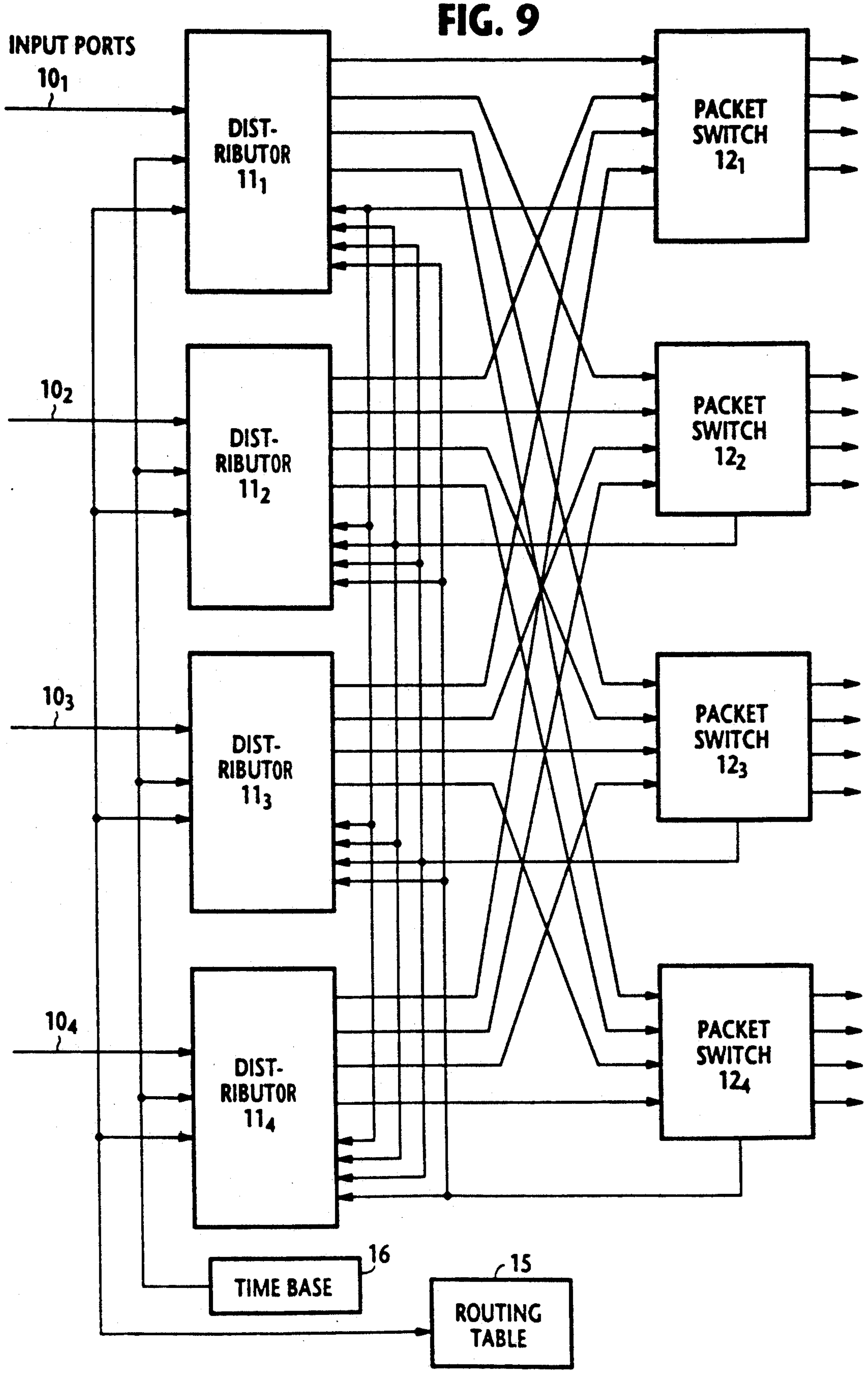
FIG. 9 is a block diagram of the packet switching system according to a second embodiment of this invention.

FIG. 9 is a block diagram of a modified packet switching system in which each packet switch 12 produces a traffic load signal indicating the count of packets outstanding in the packet switch and transmits this signal to all packet distributors 11. The purpose of this modification is to evenly distribute packets over packet switches 12.

Figure 10:
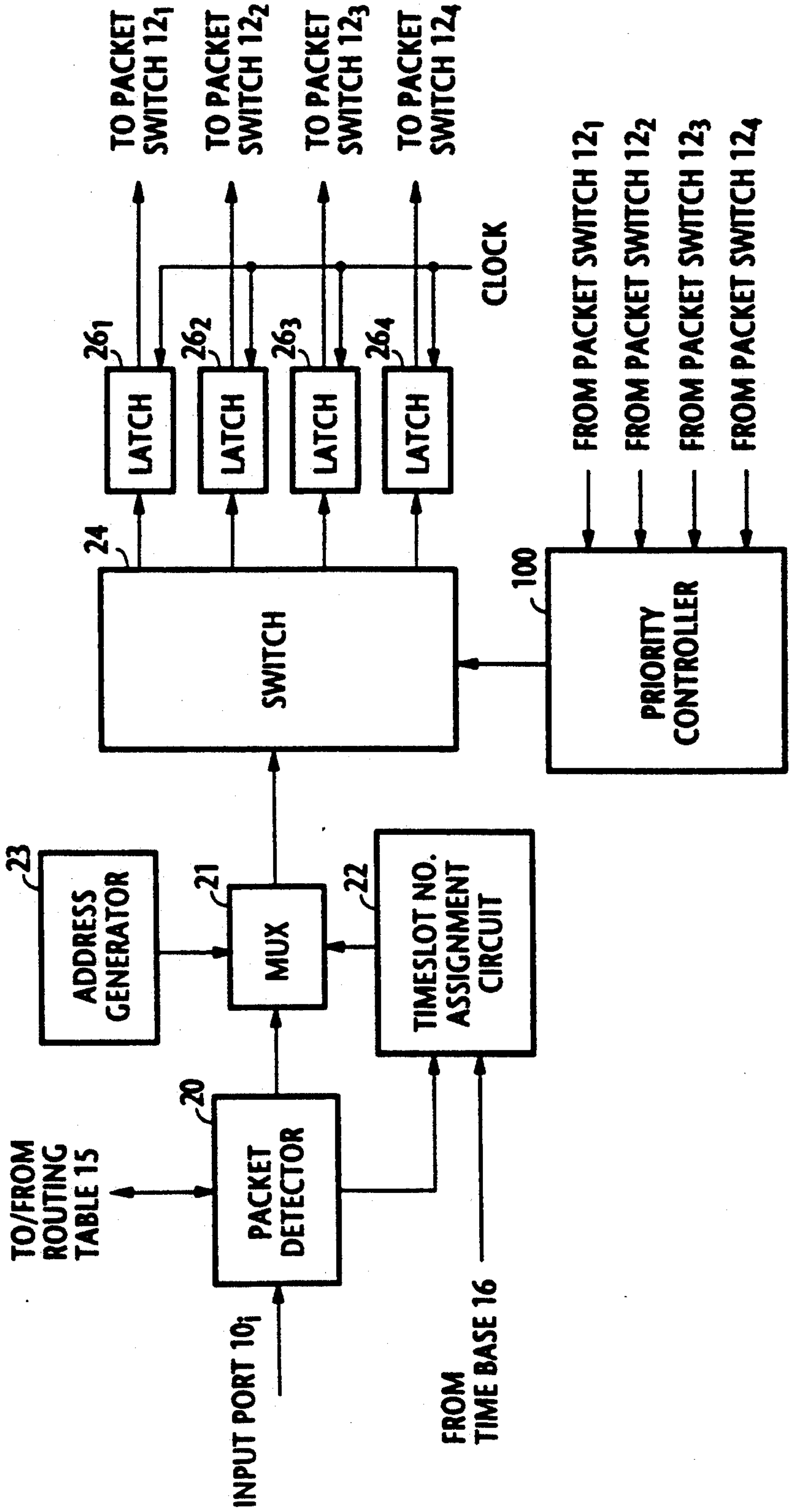
FIG. 10 shows details of a packet distributor of FIG. 9.
Figure 11:
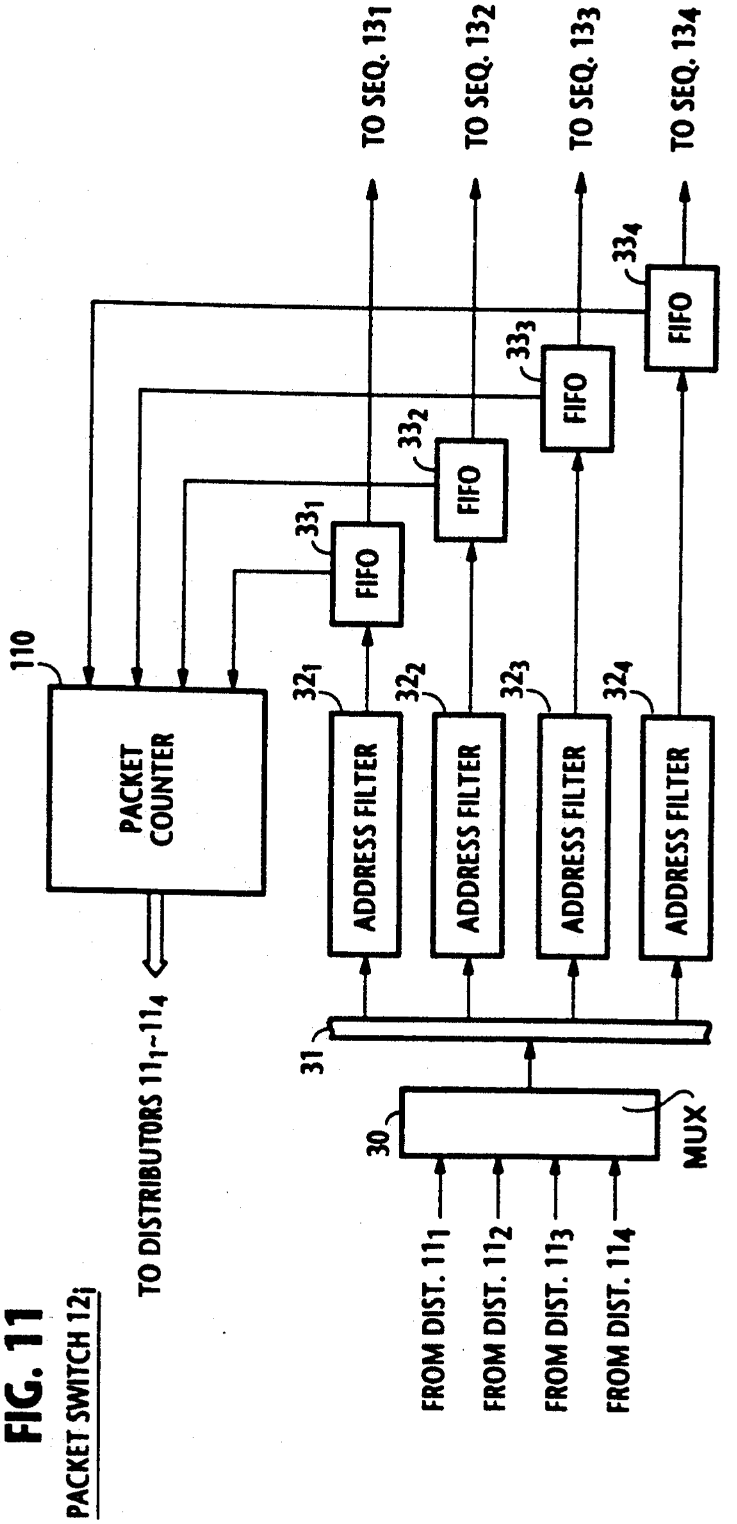
FIG. 11 shows details of a packet switch of FIG. 9.

As shown in FIG. 10, each packet distributor includes a priority controller 100 which receives packet count signals from packet switches $12_1$-$12_4$. In FIG. 11, each packet switch 12 is shown including a packet counter 110 having inputs coupled respectively to the FIFO memories $33_1$-$33_4$. Packet counter 110 produces a signal indicating the total count of packets stored in the FIFO memories 33.

Returning to FIG. 10, the priority controller 100 uses the packet counts from all packet switches and controls the switch 24 for selecting the latches 26 so that those associated with the packet switches having a smaller number of outstanding packets are selected with higher priority than those associated with the packet switches in which a greater number of packets are outstanding. More specifically, priority controller 100 determines whether the count of outstanding packets in one or more packet switches exceeds a predetermined value, and if so, it proceeds to select the packet switches other than the packet switch of which the packet count value is determined as exceeding the predetermined value.

Figure 13:
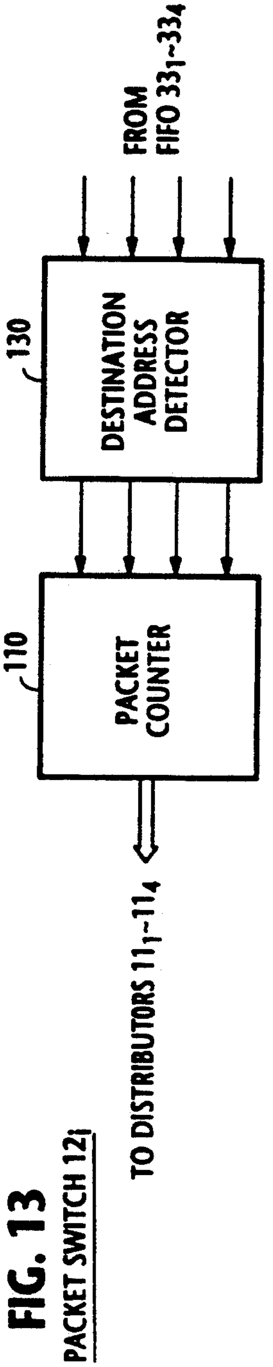
FIG. 13 shows details of a modified form of the packet switch of FIG. 9 associated with the modified packet distributor of FIG. 12.
Figure 12:
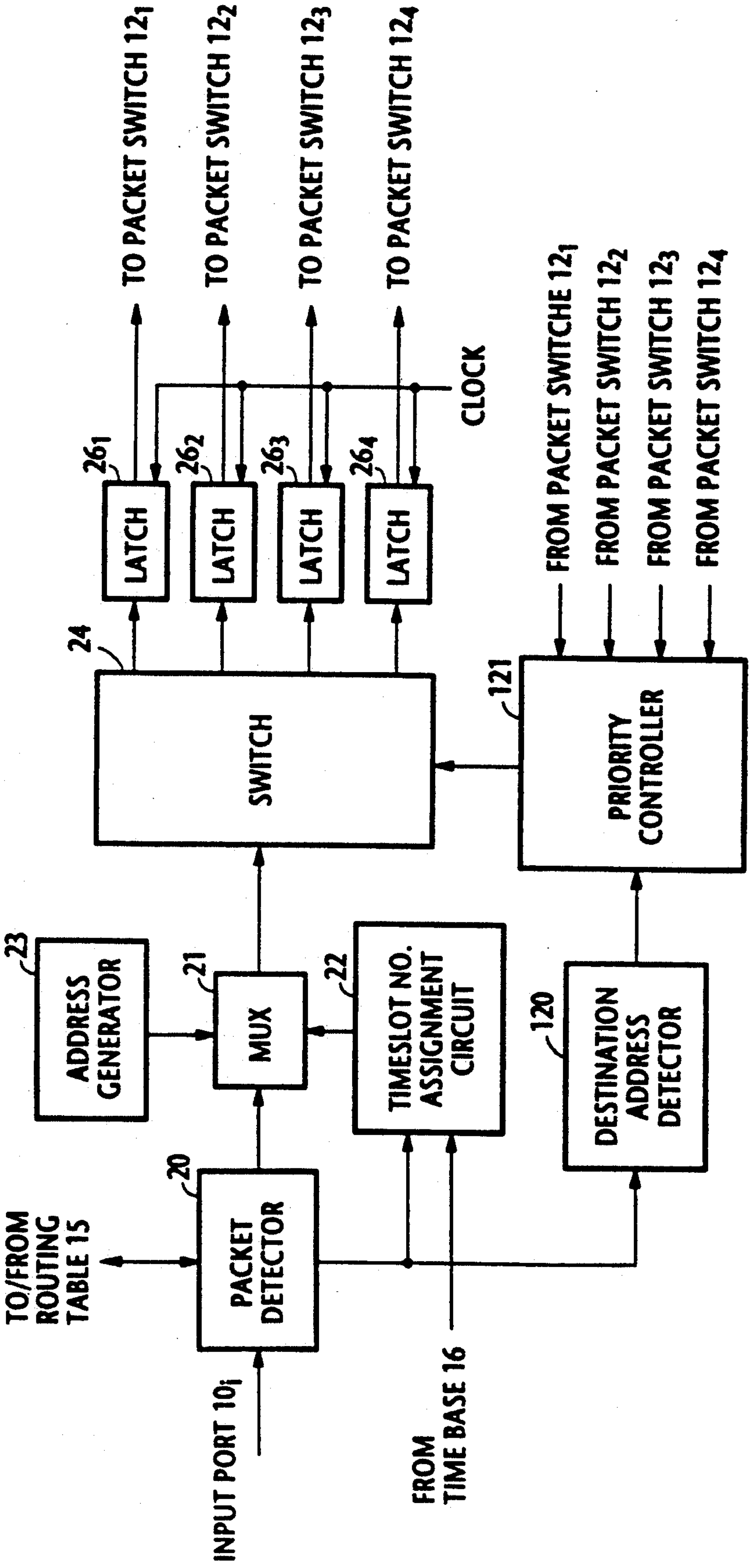
FIG. 12 shows details of a modified form of the packet distributor of FIG. 9.

In FIG. 12, each packet distributor $11_1$ is preferably provided with a destination address detector 120 coupled to the packet detector 20. The output of this detector is applied to a priority controller 121 to which traffic load signals are supplied from all packet switches. As shown in FIG. 13, each packet switch 12 includes a destination address detector 130 coupled to the FIF3 memories 33 to detect the destination addresses of the packets stored therein. The packet counter 110 produces traffic load signals each indicating the packet count for each destination, so that the signal indicates the traffic condition the destination packet sequencer 13 as well as the intermediate packet switches. In each packet distributor 11, priority controller 121 uses the output of destination address detector 120 to analyze the traffic signals from packet switches 12 and makes a search through the packet switches $12_1$ to $12_4$ to determine one or more packet switches of which the packet count value of the same destination address exceeds a predetermined value. If this is the case, priority controller 121 selects the packet switches other than such modules with priority.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A packet switching system having a plurality of input ports and a plurality of output ports, comprising:

a plurality of packet distributors associated respectively with the input ports for receiving successive packets therefrom at a data rate V, each of said packet distributors attaching a timeslot number to each of the received packets, and uniformly distributing the packets to a plurality of output terminals thereof, so that the packets appear at each of the output terminals at a data rate V/N, where N is the number of said output terminals of each of the packet distributors;

a plurality of packet switches corresponding in number to the output terminals of each of the packet distributors, each of the packet switches having a plurality of input terminals corresponding in number to the packet distributors and a plurality of output terminals corresponding in number to said output ports, the input terminals of each of the packet switches being coupled to respective output terminals of said packet distributors for switching a packet from one of the input terminals thereof to one of the output terminals thereof in accordance with a destination address contained in the packet; and a plurality of packet sequencers associated respectively with said output ports, each of the packet sequencers having a plurality of input terminals coupled to respective output terminals of the packet switches for examining the timeslot numbers attached to the packets from the input terminals thereof and delivering the packets to the associated output port in accordance with the examined timeslot numbers.

2. A packet switching system as claimed in claim 1, wherein each of said packet switches comprises means for generating a traffic-related signal indicating the amount of packets outstanding in the packet switch, and wherein each of the packet distributors comprises means for receiving said traffic-related signal from each of the packet switches and giving priority of packet distribution to the output terminals of the packet distributor according to the amounts of packets outstanding in the respective packet switches so that packets from the associated input port are distributed with priority to those of the packet switches having a smaller amount of outstanding packets.

3. A packet switching system as claimed in claim 1, wherein each of said packet switches comprises:

means for detecting destination addresses from packets respectively destined to said output ports; and means for generating a traffic-related signal indicating the respective amounts of said packets having said detected destination addresses, and wherein each of the packet distributors comprises:

means for detecting the destination addresses of incoming packets from the associated input port; and means for receiving said traffic-related signal from each of the packet switches and giving priority of packet distribution to the output terminals of the packet distributor according to the amounts of packets indicated by the traffic-related signal and according to the detected destination addresses of said incoming packets so that the incoming packets are distributed with priority to those of the packet switches having a smaller amount of packets containing the same destination address as said incoming packets.

4. A packet switching system as claimed in claim 1, wherein each of said packet sequencers comprises:

multiplexer means for multiplexing packets from the input terminals thereof;

timeslot detector means for detecting the timeslot number of said multiplexed packets;

address generator means for generating address signals corresponding to said multiplexed packets, respectively;

memory means responsive to said address signals for storing said multiplexed packets in locations respectively identified by said address signals;

combiner means for combining the address signals and the detected timeslot numbers to produce data sets;

packet arranging means for arranging said data sets according to the timeslot numbers contained therein; and gate means for applying the address signals contained in the arranged data sets to said memory means for reading packets stored therein.

5. A packet switching system as claimed in claim 4, wherein said packet arranging means comprises:

a plurality of latches series-connected in a first circuit; and a plurality of compare-and-select circuits series-connected in a second circuit, said compare-and-select circuits being connected to corresponding ones of said latches and to said combiner means for receiving the data set from the combiner means, each of the compare-and-select circuits comparing the timeslot number of each data set in said first circuit with the timeslot number of each data set in said second circuit and interchanging the data sets between said first and second circuits and applying the data set from the first circuit to a subsequent compare-and-select circuit when the timeslot number of the data set in said second circuit is smaller than the timeslot number of the data set in said first circuit, so that data sets stored in said latches are arranged according to the timeslot numbers thereof.

6. A packet switching system as claimed in claim 5, wherein said gate means comprises:

means for detecting a difference between the timeslot number of each data set stored in one of said latches and a reference timeslot number; and means for comparing said difference with a threshold value and applying the address signal contained in the data set stored in said one of said latches to said memory means when said difference exceeds said threshold value.

7. A packet switching system as claimed in claim 6, wherein said threshold value represents a maximum number of packets outstanding in each of said packet switches.

8. A packet switching system as claimed in claim 1, wherein each of said packet distributors comprises means for attaching an input-port address identifying the associated input port, and wherein each of said packet sequencers comprises:

first multiplexer means for multiplexing packets from the input terminals of the packet sequencer;

a plurality of address filter means corresponding respectively to said input ports, each of the address filter means being coupled to said first multiplexer means and having the input-port address of the corresponding input port for detecting packets from the output of the first multiplexer means having the same input-port address as the address filter means;

a plurality of memory means coupled respectively to said address filter means;

a plurality of memory control means associated respectively with said address filter means and with said memory means, each of the memory control means comprising means for detecting timeslot numbers from the packets detected by the associated address filter means, means for generating write address signals corresponding to said detected timeslot numbers for storing the packets detected by the associated address filter means into said associated memory means according to said write address signals, and means for sequentially generating read address signals for reading packets from the associated memory means according to said read address signals; and second multiplexer means for multiplexing packets read out of said plural memory means.

9. A packet switching system as claimed in claim 1, wherein each of said packet sequencers comprises:

a plurality of first-in-first-out memory having input ends connected respectively to the input terminals of the packet sequencer and having output ends coupled together to the associated output port;

a plurality of timeslot number detectors connected respectively to the output ends of said first-in-first-out memory means; and control means for detecting a minimum value of said detected timeslot numbers and shifting one of said first-in-first-out memory means corresponding to the timeslot number of the detected minimum value.

10. A packet switching system as claimed in claim 9, wherein each of said packet sequencers further comprises means for detecting when at least one of said first-in-first-out memory means is empty and disabling said control means.

11. A packet switching system as claimed in claim 1, wherein each of said packet sequencers comprises:

a plurality of timeslot number detectors coupled respectively to the input terminals of the packet sequencer for extracting timeslot numbers from packets arriving at said input terminals;

a first plurality of first-in-first-out memory means having input ends connected respectively to said timeslot number detectors for storing the packets from the timeslot number detectors and having output ends coupled together to the associated output port;

a second plurality of first-in-first-out memory means having input ends connected respectively to said timeslot number detectors for storing the timeslot numbers detected respectively by the timeslot number detectors;

timeslot number generator means for sequentially generating a local timeslot number; and control means connected to the output ends of the first plurality of first-in-first-out memory means for sequentially reading the timeslot numbers stored in said output ends, comparing said local timeslot number and each of the timeslot numbers read out of said memory means to detect a match or mismatch therebetween, and shifting one of said first plurality of first-in-first-out memory means and one of said second plurality of first-in-first-out memory means when there is a match between said timeslot numbers and incrementing said timeslot number generator means when there is a mismatch between said timeslot numbers.

12. A packet switching system as claimed in claim 11, wherein wherein each of said packet sequencers further comprises means for detecting when at least one of said first plurality of first-in-first-out memories is empty and disabling said control means.

13. A packet switching system as claimed in claim 1, wherein each of said packet sequencers comprises:

a plurality of first-in-first-out memory means having input ends connected respectively to the input terminals of the packet sequencer and having output ends;

a first plurality of timeslot number detectors connected respectively to the output ends of said first-in-first-out memory means for detecting timeslot numbers from packets stored in said output ends;

timeslot number generator means for sequentially generating a local timeslot number;

control means connected to the first plurality of timeslot number detectors for sequentially reading the timeslot numbers detected by the first plurality of timeslot number detectors, comparing said local timeslot number and each of the timeslot numbers detected by the first plurality of timeslot number detectors to detect a match or mismatch therebetween, and shifting one of said first-in-first-out memory means when there is a match between said timeslot numbers and incrementing said timeslot number generator means when there is a mismatch between said timeslot numbers;

a second plurality of timeslot number detectors for detecting, when enabled, timeslot numbers from packets arriving at the input terminals of the packet sequencer;

means for detecting when at least one of said first-in-first-out memories is empty, disabling said control means and enabling said second plurality of timeslot number detectors to allow detection of said timeslot numbers;

means for detecting when each of the timeslot numbers detected by the second plurality of timeslot number detectors is greater than the local timeslot number and incrementing said timeslot number generator means; and a plurality of end-of-sequence detector means connected respectively to the output ends of said first-in-first-out memory means for detecting when there is no packet to follow and incrementing said timeslot number generator means.

14. A packet switching system as claimed in claim 1, wherein each of said packet switches is a self-routing switch.

* * * * *